United States Patent

Chen et al.

[11] Patent Number: 5,521,807
[45] Date of Patent: May 28, 1996

[54] DC-TO-DC CONVERTER WITH SECONDARY FLYBACK CORE RESET

[75] Inventors: Ming L. Chen, Kirkland; Jay A. Kuehny, Redmond, both of Wash.

[73] Assignee: Interpoint Corporation, Redmond, Wash.

[21] Appl. No.: 169,734

[22] Filed: Dec. 16, 1993

Related U.S. Application Data

[63] Continuation-in-part of Ser. No. 999,649, Dec. 31, 1992, abandoned.

[51] Int. Cl.$^6$ ............................................. H02M 3/335
[52] U.S. Cl. ........................... 363/21; 363/97; 363/131
[58] Field of Search ......................... 363/20, 21, 97, 363/131

[56] References Cited

U.S. PATENT DOCUMENTS

| | | | |
|---|---|---|---|
| 3,735,235 | 5/1973 | Hamilton | 321/2 |
| 4,399,499 | 8/1983 | Butcher et al. | 363/17 |
| 4,441,146 | 4/1984 | Vinciarelli | 363/20 |
| 4,675,796 | 6/1987 | Gautherin et al. | 363/20 |
| 4,688,160 | 8/1987 | Fraidlin | 363/21 |
| 4,716,514 | 12/1987 | Patel | 363/127 |
| 4,717,994 | 1/1988 | Diaz et al. | 363/21 |
| 4,730,241 | 3/1988 | Takaya | 363/19 |
| 4,785,387 | 11/1988 | Lee et al. | 363/21 |
| 4,788,634 | 11/1988 | Schlecht et al. | 363/21 |
| 4,823,249 | 4/1989 | Garcia, II | 363/48 |
| 4,961,128 | 10/1990 | Bloom | 363/16 |
| 5,003,451 | 3/1991 | Gradl et al. | 363/56 |
| 5,012,401 | 4/1991 | Barlage | 363/97 |
| 5,126,931 | 6/1992 | Jitaru | 363/21 |

OTHER PUBLICATIONS

K. Wallace, "Resonant Reset", IBM Technical Disclosure Bulletin, vol. 26, No. 11, Apr. 1984.
Joachim Wustehube u.a., Band 33 Kontakt & Studian Elektronik, dated 1982 (2 pages).
Printout of Search, patent data from Dialog "Claims" database (14 pages), Nov. 11, 1982.

*Primary Examiner*—Peter S. Wong
*Assistant Examiner*—Y. Jessica Han
*Attorney, Agent, or Firm*—Graybeal Jackson Haley & Johnson

[57] ABSTRACT

A secondary flyback core reset (SFCR) scheme for single-ended forward DC-to-DC converters is disclosed. The transformer secondary magnetizing inductor and a parasitic reset capacitance of the output forward rectifier diode form a secondary flyback reset circuit. The magnetic flux built up through the primary winding when the main switch is turned on is reset through this secondary flyback reset circuit when the main switch is turned off. The secondary flyback reset circuit initiates a half resonant cycle and resets the transformer. With proper design of the reset time, the maximum duty cycle of the main switch can go beyond 50%, while still using the first and third quadrants of the core B-H loop characteristics for optimum use of the core power density, and reduced RMS switching current and rectifier blocking voltages and power switch blocking voltage.

1 Claim, 4 Drawing Sheets

DC-TO-DC CONVERTER WITH SECONDARY FLYBACK CORE RESET

This application is a continuation-in-part of application Ser. No. 07/999,649, filed Dec. 31, 1992, now abandoned.

BACKGROUND OF THE INVENTION

1. Field of Invention

This invention relates to a single-ended forward DC-to-DC converter with a new transformer secondary flyback reset scheme which allows its transformer to operate in both the first and third quadrants of B-H loop and extends its maximum duty cycle beyond 50% duty cycle.

2. Description of the Prior Art

The single-ended forward DC-to-DC converter is widely used in converting one DC voltage source to a different DC voltage supply for both small and medium power range due to its circuit simplicity and power conversion efficiency. However, the power transformer of this type of converter needs a transformer reset because the voltage applied to the power transformer is not a symmetrical AC waveform. The waveform actually consists of both a AC and a DC voltage components with the magnitude varies with both the input voltage and duty cycle. Without proper reset, the power transformer will saturate and result in a short circuit seen by the input voltage source.

There are known methods to reset the transformer including, for example, adding a reset winding, adding a capacitor in the primary across the main switch or across the forward rectifier diode in the secondary, to cause a resonant reset, and using a Zener clamp. In the first method, a reset winding with the number of turns equal to the primary winding is added and connected in series with a diode then across the input voltage source. The reset winding resets the transformer by providing a negative input voltage across its winding and recycles the magnetizing energy back to the input voltage source. The second example causes forward reset and dissipates the corresponding energy stored in the added capacitor through the main switch resulting in unwanted current stress on the switch, slowing down of the switch on/off operations, and higher switching losses. The alternative of connecting an added capacitor component across the rectifier diode increases failure rate, and adds cost and bulk to the converter package. In the third example, a Zener diode in series with a regular diode is connected across the transformer primary winding. The Zener clamp provides a negative voltage to the primary winding of the power transformer to reset its magnetic flux. The magnetizing energy in this case is dissipated by the Zener clamp.

There are major limitations when using one or more of these existing transformer reset schemes. First, the magnetic core of the power transformer only operates at the first quadrant of the flux density versus magnetizing force (B-H) loop and the third quadrant operation is not utilized. Second, the maximum duty cycle of the converter is essentially limited to 50%. Although the maximum duty cycle can be increased by either reducing the number of turn of the reset winding or increasing the Zener voltage, the blocking voltage requirement of both the primary main switching device and the secondary rectifier diodes will be proportionally increased. This is not recommended because the increase in voltage rating will increase conduction losses at both the main switching device and the secondary rectifier diode.

These limitations result in certain disadvantages including: a bigger magnetic core is needed compared to some other converter topologies (e.g., Push-pull converter); the RMS current is higher and causes larger power consumption; the current ripple is higher and causes excessive EMI; and the current stress on the main switch is undesirably large and causes higher switching losses.

SUMMARY OF THE INVENTION

This invention provides the solutions to overcome the two main limitations of existing transformer reset schemes for single-ended forward converters: poor utilization of magnetic core of the transformer and 50% limitation of the maximum duty cycle. Secondary flyback core reset (SFCR) provides a new transformer secondary flyback reset scheme for the single-ended forward DC-to-DC converters to improve transformer size, conversion efficiency and reduced EMI.

In the preferred embodiment of this SFCR configuration, a parasitic reset capacitance Cr with the secondary forward rectifier diode is used. This parasitic reset capacitance Cr and the secondary magnetizing inductor of the transformer form a secondary flyback reset circuit whose resonant period is determined by their capacitance and inductance. When the main switch is turned on, the input voltage is applied directly to the primary winding of the transformer and produces a magnetizing current which in turn builds up a magnetic flux inside the magnetic core. The magnitude of this magnetizing current depends on the input voltage and the turn-on time of the main switch. When the switch is turned off, the magnetizing current is immediately reflected to the secondary winding of the transformer. The secondary flyback reset circuit then initiates a half resonant cycle which first discharges the magnetizing current to zero and then further charge it to negative with the final value approximately equal to its starting value. This process forces the transformer to reset completely and its magnetic flux excursion to travel symmetrically from the first quadrant to the third of the B-H loop. In this case, the maximum flux excursion without saturating the transformer is twice compared to commonly used transformer reset schemes. Therefore, the utilization of the transformer magnetic core is doubled.

If half the resonant period of the secondary flyback reset circuit is chosen to be less than 50% of the switching period of the main switch, the maximum duty cycle can go beyond 50%. As long as half the resonant period of the reset circuit plus the maximum duty cycle time is less than the switching period of the main switch, the magnetic flux excursion of the transformer will occur symmetrically between the first and third quadrants of the B-H loop. If this condition does not hold, the magnetic flux excursion of the transformer will not be symmetrical between the first and third quadrants of the B-H loop but with majority magnetic flux excursion occurring in the first quadrant. This would limit the utilization of the magnetic core and also create a higher peak voltage across the parasitic reset capacitance.

If a capacitor were connected across the main switch to forward reset the transformer as in one of the above mentioned prior art examples, it will cause additional switching losses during the switching transition of the main switch. When the main switch turns on, the energy stored in the primary capacitor which is proportional to the square of input voltage will be completely dissipated through the main switch. The capacitor will also slow down the turn-off process of the main switch and thus increase the switching loss as indicated in the above background.

These and further objectives, features and advantages of the invention will become apparent from the following detailed description and accompanying drawings.

DETAILED DESCRIPTION OF THE INVENTION

Figure 1:
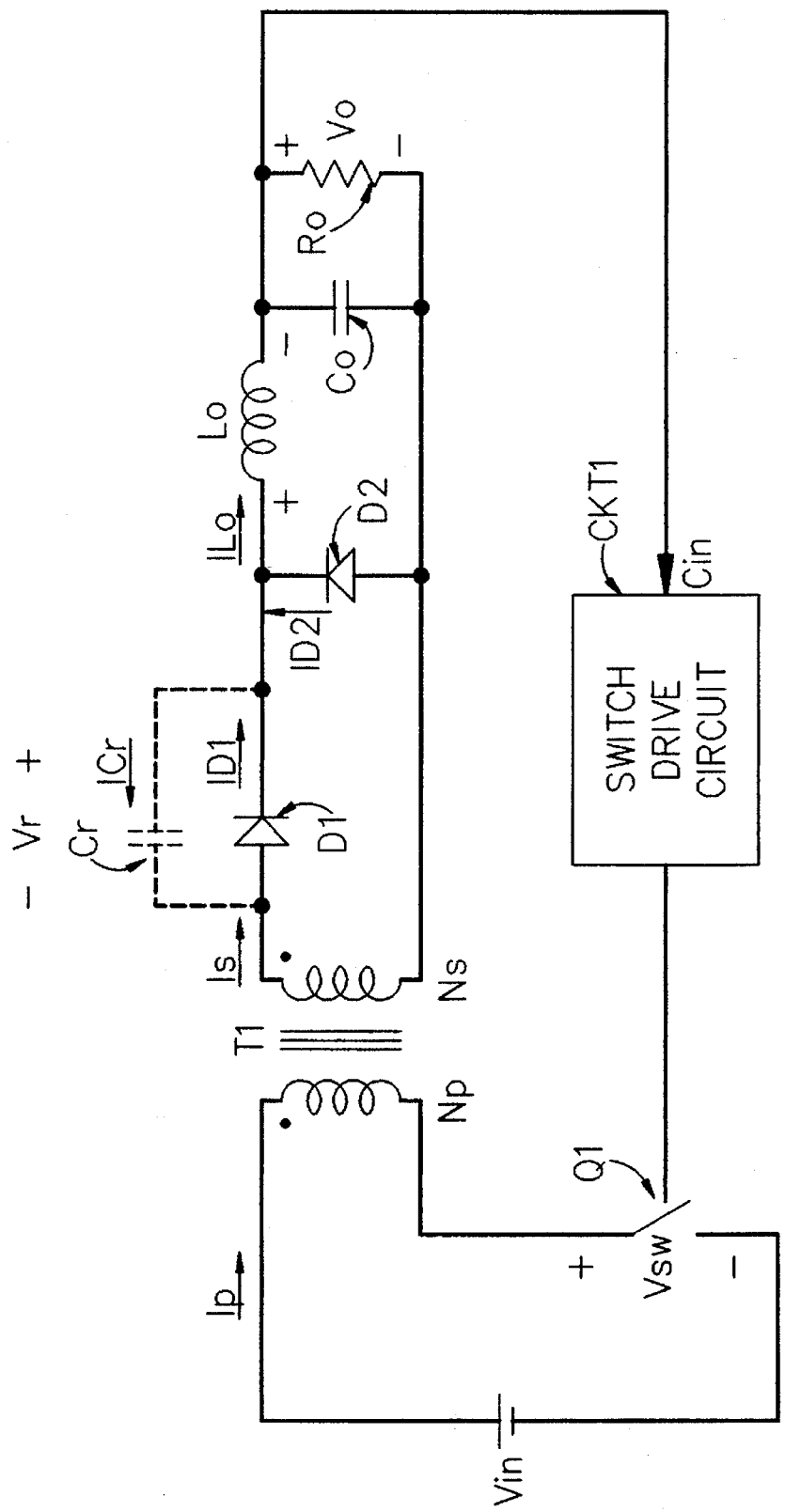
FIG. 1 discloses a DC-to-DC converter with secondary flyback core reset.
Figure 2A:
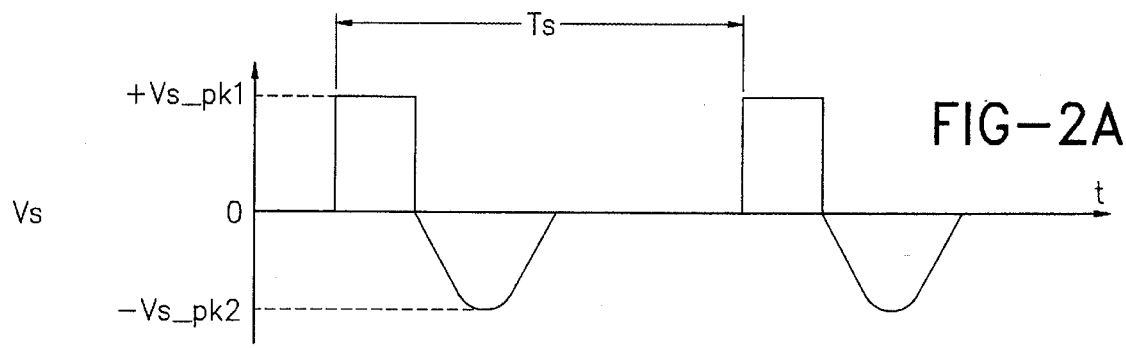
FIG. 2 discloses waveforms of the secondary flyback core reset transfer with reset capacitor completely discharged.
Figure 2B:
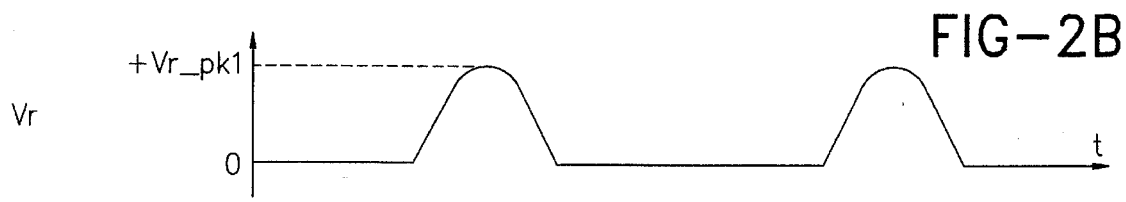
Figure 2C:
Figure 2D:
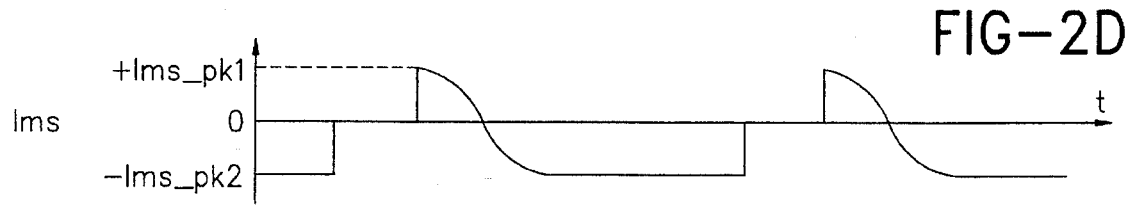
Figure 2E:
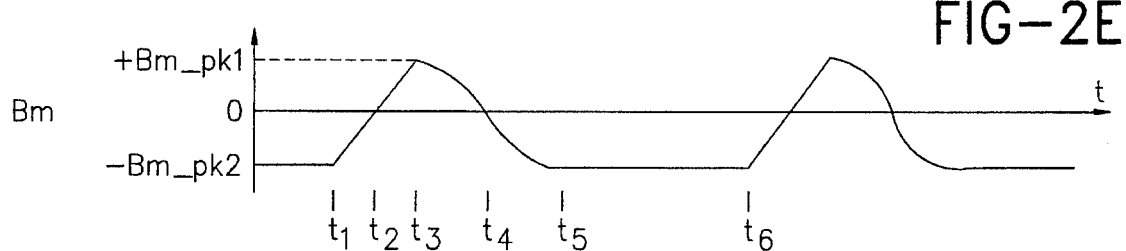
Figure 3A:
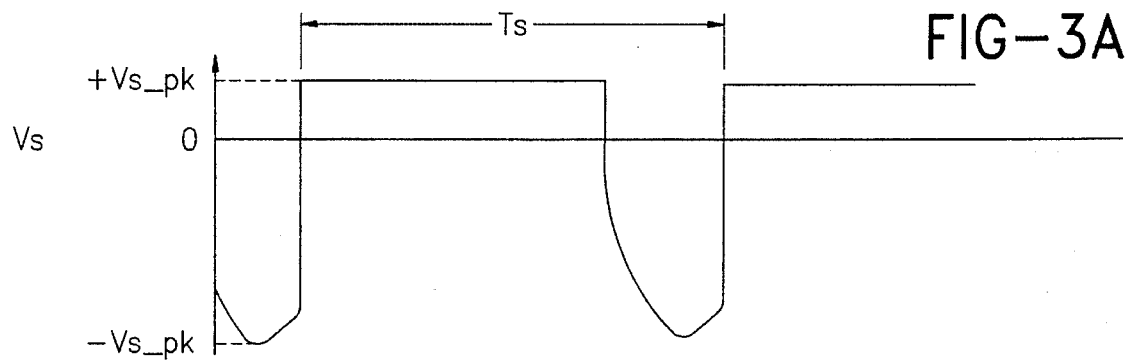
FIG. 3 discloses waveforms of secondary flyback core reset with reset capacitor not completely discharged.
Figure 3B:
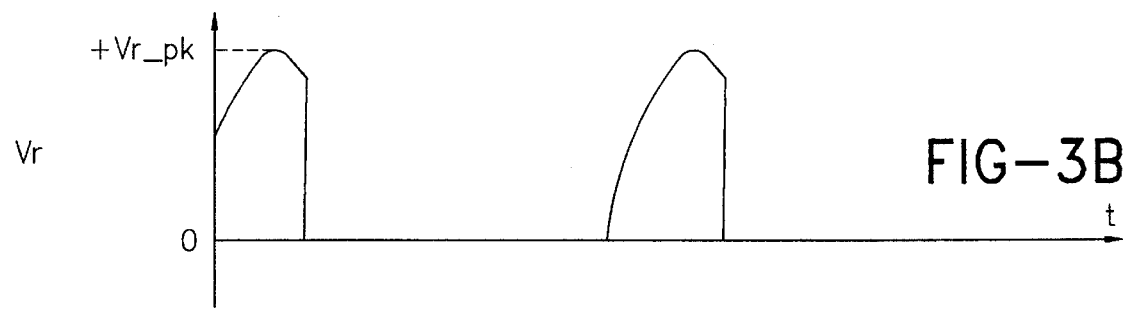
Figure 3C:
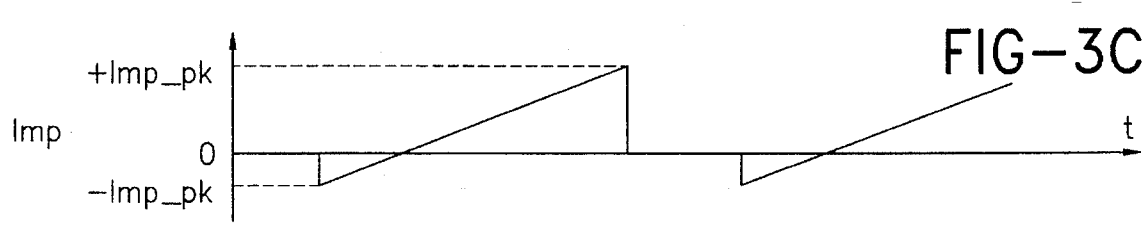
Figure 3D:
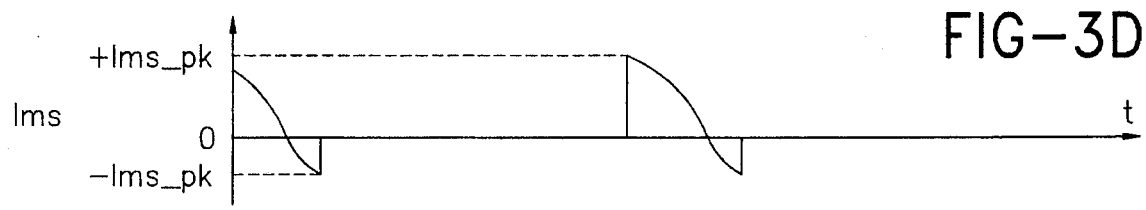
Figure 3E:
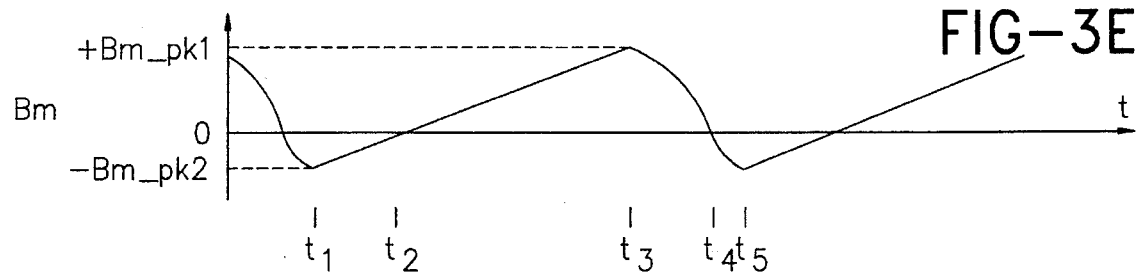

A DC-to-DC converter with a secondary flyback core reset (SFCR) is shown in FIG. 1. It is designed to efficiently convert a DC input voltage source Vin to a DC output voltage supply Vo. The main switch Q1 in series with the primary winding of T1 is turned on or off by switch driver circuit CKT1 having a variable duty cycle, of the type known per se, with a certain duty cycle and at a constant frequency which in turn generates a stream of square wave voltage waveform across the primary winding of transformer T1. The transformer T1 provides power transfer, electrical isolation and voltage level adjustment between its primary and secondary windings. The forward rectifier diode D1 in series with the load and catch diode D2 in shunt with the transformer secondary and D1 pass the square wave waveform from the secondary winding of the transformer T1 to the output filter of series inductor Lo and shunt capacitor Co. This square wave waveform is then filtered to become a DC voltage Vo. Ro is a load resistor. The switch drive circuit has a voltage control input C that monitors the output voltage Vo and adjusts the duty cycle of the main switch Q1 to maintain the output voltage at a constant value. The transformer T1 has two windings on a transformer core with Np turns of primary winding and Ns turns of secondary winding. Parasitic reset capacitance Cr (shown by dotted lines) associated with the forward rectifier D1 resets the transformer T1 during the off-time of the main switch Q1.

FIG. 2 shows the steady-state voltage and current waveforms at various locations of the SFCR circuit during the six time increments, t1 to t6, which make up the total switching period for the case that the parasitic reset capacitance Cr is completely discharged and the converter is operating at continuous inductor current mode. Vs is the voltage across the secondary winding of the transformer T1. Vr is the voltage across the parasitic reset capacitance Cr. Imp and Ims are the primary and secondary magnetizing current of the transformer T1. Bm is the magnetic flux built up inside the magnetic core of the transformer T1.

At the time between t1 and t3, the main switch Q1 is turned on. The input voltage Vin is directly applied to the primary winding of the transformer T1 and generates a secondary voltage Vs across the secondary winding which forces D1 to be turned on and D2 to be turned off.

$$Vs=(Ns/Np) \cdot Vin \qquad (1)$$

Neglecting the forward voltage drop of D1, the voltage across the parasitic reset capacitor Cr is zero. Ip, the primary current of the transformer T1 is equal to the summation of the transformer primary magnetizing current Imp and the reflected output current Ip1, $$Imp(t)=(Vin/Lmp) \cdot (t-t1) - Imp_{13}pk2 \qquad (2)$$

$$Imp_{13}pk2 = Imp_{13}pk1 = 0.5 \cdot Vin \cdot Ton/Lmp \qquad (3)$$

$$Ip1(t)=(Ns/Np) \cdot ILo(t) \qquad (4)$$

where Ton=t3−t1, Lmp is the primary magnetizing inductance and ILo is output inductor current. Imp is defined as positive when it flows into the dot of the transformer primary winding. The magnetic flux density Bm built up inside the magnetic core of the transformer T1 during this period can be expressed as follows:

$$Bm(t)=[Lmp \cdot Imp(t)]/[Np \cdot Ac] \qquad (5)$$

where Ac is the cross section area of the magnetic core. As seen from Equation (5), Bm(t) is linearly proportional to Imp(t). Therefore, the profile of Bm(t) is very similar to that of Imp(t) which changes from its negative peak value at time t1 to its positive peak value at time t3. The magnitude of the positive peak magnetic flux density is also equal to the negative peak magnetic flux density. Since the transformer is magnetized by the input voltage source Vin through the primary winding, the secondary magnetizing current Ims is zero during this period.

At time t3 the main switch is turned off and remains off till time t6. When the main switch Q1 is turned off, the primary magnetizing current cannot continue flowing through the primary winding and is hence reflected to the secondary winding. The secondary magnetizing current Ims can be obtained, $$Ims(t3)=(Np/Ns) \cdot Imp(t3) \qquad (6)$$

or $$Ims_{13}pk1=(Np/Ns) \cdot Imp_{13}pk1 \qquad (7)$$

The secondary magnetizing current Ims begins to flow into the dot of the transformer secondary winding, through catch diode D2 and the parasitic reset capacitance Cr. The reset capacitance Cr which is charged by the secondary magnetizing current reverses bias across the forward rectifier diode D1 and turns it off. The catch diode D2 is turned on to conduct the output inductor current ILo to Ro and Co.

At the time period between t3 and t5, the transformer secondary inductor Lms and the parasitic reset capacitance Cr form a resonant circuit whose resonant frequency wr is equal to $$wr = 1/\sqrt{Lms \cdot Cr} \qquad (8)$$

The secondary magnetizing current starts charging the parasitic reset capacitance Cr at time t3 and its current drops to zero at time t4 when the parasitic reset capacitance Cr is charged to its peak voltage Vr_pk.

$$Vr\_pk=Ims\_pk1 \cdot Zc \qquad (9)$$

where, $$Zc = \sqrt{(Lms/Cr)} \qquad (10)$$

Therefore at time t4, the magnetizing energy of the transformer T1 is completely transferred to the parasitic reset capacitance Cr if parasitic losses are neglected.

From the time period between t4 and t5, the parasitic reset capacitance Cr begins to discharge and the secondary magnetizing current reverses its direction (i.e., flows out of the dot of the transformer secondary winding). The parasitic reset capacitance Cr is finally discharged to zero and the secondary magnetizing current Ims reaches its negative peak value which is equal to its positive peak one at time t5. The voltage waveform capacitor Vr and the secondary magnetizing current Ims between time t3 and t5 are a half cycle sinewave whose frequency wr is defined in Equation (8). Since the catch diode D1 is turned on, the voltage across the secondary winding of the transformer T1 is equal to −Vr for the same period of time. The magnetic flux Bm is linearly proportional to the secondary magnetizing current and can be expressed as $$Bm(t)=[Lms \cdot Ims(t)]/[Ns \cdot Ac] \quad (11)$$

where Lms is the secondary magnetizing inductance of the transformer T1. The magnetic flux Bm also changes from its positive peak value at time t3 to its negative peak one at time t5.

At time t5, the secondary magnetizing current is trying to charge the parasitic reset capacitance Cr to a negative voltage. When this happens, the forward rectifier diode D1 is forward biased and turned on. Since the catch diode is still turned on between the time period t5 and t6 due to continuous inductor current mode operation, the secondary winding is electrically shorted through the forward rectifier diode D1 and the catch diode D2. In this case, the secondary magnetizing current will remains at its negative peak value Ims_pk2 between time t5 and t6, and the magnetizing energy will be kept in the secondary magnetizing inductor. The magnetic flux Bm will remain at its negative peak value, and both the transformer secondary voltage Vs and the parasitic reset capacitance voltage Vr will be zero from time t5 to t6. A new switching cycle starts at time t6.

The recycling of the magnetizing energy of the transformer T1 can be realized from the magnetizing current. Between the time t1 and t3, since the transformer is energized from the primary winding, the secondary magnetizing current Ims is zero. From the time t3 to t6, since the transformer is parasitic reset from the secondary winding and the main switch is off, the primary magnetizing current Imp is zero. This can be observed in FIG. 2. The magnetizing energy is actually recycled back to the input voltage source Vin at the time between t1 and t2 when the primary magnetizing current flows out of the dot of the primary winding of the transformer T1 and charges Vin. From the time t2 to t3, the input voltage source provides magnetizing energy to the transformer T1 through the primary winding.

The reset of the transformer T1 can be realized from the voltage waveform of the transformer secondary voltage Vs in FIG. 2. To completely parasitic reset the transformer T1, the voltage ·time (secs) product Ap, for the time period t1 to t3, must be equal to the product An for the time period t3 to t5. Ap can be calculated as follows:

$$Ap=Vs \cdot Ton \quad (12)$$

Replace Vs from Equation (1), one can obtain $$Ap=(Ns/Np) \cdot Vin \cdot Ton \quad (13)$$

An can be calculated as follows:

$$An = \int_{t3}^{t5} Vs\_pk2 \cdot \sin(wr \cdot (t-t3)) \cdot dt \quad (14)$$

Since Vs_pk2=Vr_pk, Equation (15) becomes $$An = \int_{t3}^{t5} Vr\_pk \cdot \sin(Wr \cdot (t-t3)) \cdot dt \quad (15)$$

$$= (2/wr) \cdot Vr\_pk \quad (16)$$

Replacing wr by Equation (8) and Vr_pk by Equation (9), Equation (16) would be, $$An = 2 \cdot \sqrt{(Lms \cdot Cr)} \cdot Ims\_pk1 \cdot Zc \quad (17)$$

If Zc is replaced by Equation (10) and Ims_pk1 replaced by Equation (7), Equation (17) becomes $$An=2 \cdot Lms \cdot (Np/Ns) \cdot Imp\_pk1 \quad (18)$$

Combining Equation (3) and (18), one can obtain, $$An=(Lms/Lmp) \cdot (Np/Ns) \cdot Vin \cdot Ton \quad (19)$$

Since $$Lms/Lmp=Ns^2/Np^2 \quad (20)$$

Therefore, Equation (19) becomes $$An=(Ns/Np) \cdot Vin \cdot Ton \quad (21)$$

Equations (13) and (21) prove that the voltage·time (seconds) products Ap and An are equal. Therefore the transformer is completely reset. As seen from FIG. 2, the magnetic flux density Bm changes from its negative peak value to its positive peak value and back to its negative peak value in a complete switching cycle. Since the two peak values are equal, the magnetic flux travels symmetrically between the first and the third quadrants of the B-H loop for optimum use of the core.

If half the resonant period (1/wr) of the secondary flyback parasitic reset circuit is chosen to be less than 50% of the switching period (Ts) of the main switch, the maximum duty cycle can go beyond 50%. As long as half the resonant period of the reset circuit plus the maximum duty cycle time is less than the switching period of the main switch, the magnetic flux excursion of the transformer will occur symmetrically between the first and third quadrants of the B-H loop. If this condition does not hold, the magnetic flux excursion of the transformer will not be symmetrical between the first and third quadrants of the B-H loop but with majority magnetic flux excursion occurring in the first quadrant. The waveforms in FIG. 3 are shown for this asymmetrical mode, and are presented in the same format as FIG. 2 for comparison. In this asymmetrical case, the parasitic reset capacitance Cr is charged to a higher voltage to reset the transformer and its voltage is not completely discharged in a switching cycle. This would limit the utilization of the magnetic core and also create a higher peak voltage across the parasitic reset capacitance. Therefore, voltage stress on both the forward rectifier diode D1 and the main switch Q1 will increase when operating in this mode. Part of the magnetizing energy stored in the parasitic reset capacitance will be dissipated through the forward rectifier diode D1.

Cr is the actual capacitance seen at the forward rectifier diode D1 and includes parasitic capacitance. By employing a diode D1 that has parasitic capacitance is large enough, shunt component capacitance is omitted and the parasitic capacitance determined and used as the design parasitic reset parameter Cr. The SFCR topology can also be expanded to multiple-output applications as set forth in FIG. 4. In such case, the parasitic reset capacitance will be the total equivalent capacitance referred to any particular secondary winding of the transformer.

Figure 4:
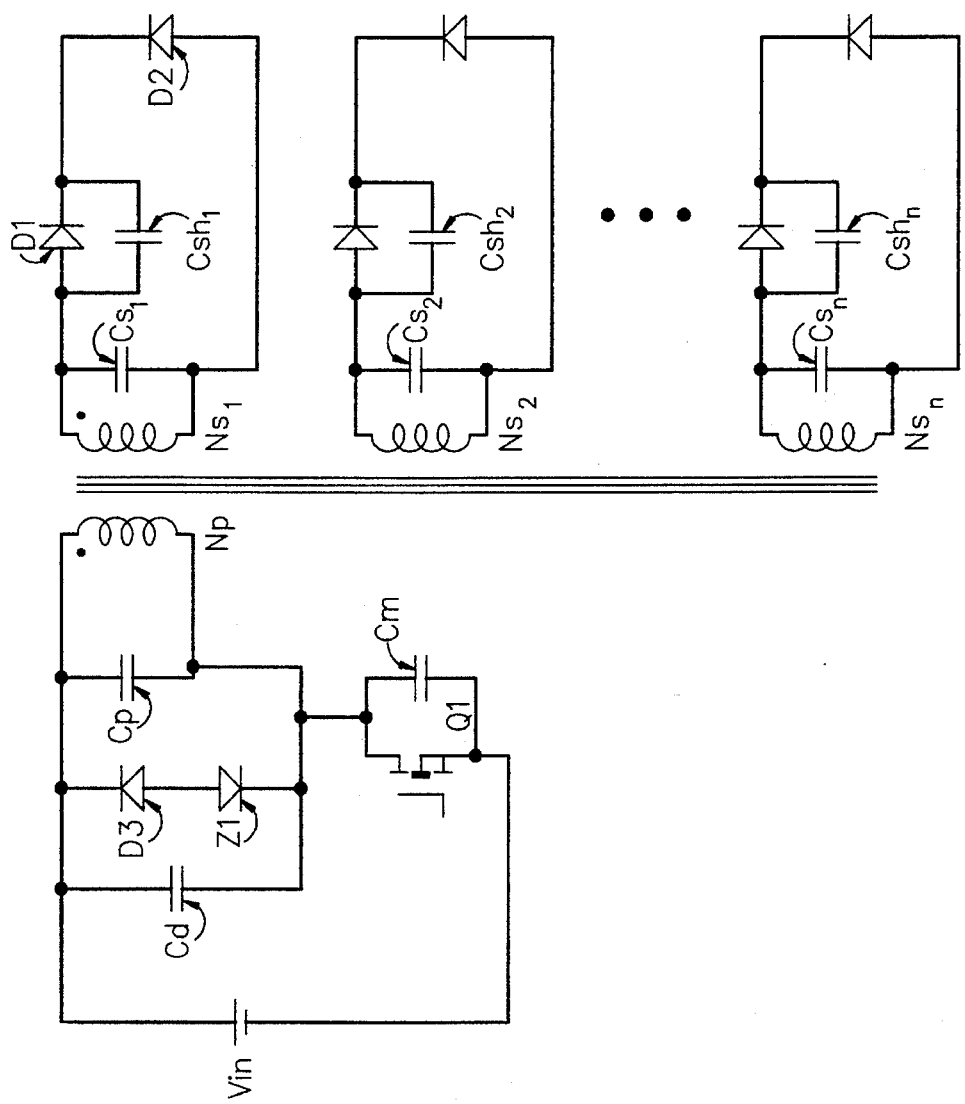
FIG. 4 shows a preferred alternative embodiment accounting for all significant parasitic capacitance that contributes to the resonant reset and in a multiple output configuration.

In the embodiment of this invention shown in FIG. 4, the transformer secondary magnetizing inductor (Lms) and a parasitic reset capacitance (Cr) in the secondary form the reset circuit. With design procedures and component selections disclosed herein, the reset capacitance Cr is actually a combined parasitic capacitance provided by an output forward Schottky rectifier diode D1, transformer windings Np and Ns, main MOSFET switch Q1, and a diode D3 and Zener diode Z1 circuit connected as a clamp across the primary winding. As seen in FIG. 4, Cd, Cm, Cp, Cs, Csh are the equivalent parasitic capacitance of series diode D3 and Zener diode Z1, MOSFET switch Q1, transformer primary winding Np, transformer secondary windings, Ns, and output Schottky rectifier diode D1. Np and Ns are the number of turns of transformer primary and secondary winding respectively. Furthermore, as shown in FIG. 4, this embodiment provides a multiple of n outputs #1, #2 - - - n, driven by a common transformer primary and core. Each output #1, #2 - - - n has its own secondary winding $Ns_{1,2 \ldots n}$ and rectifier diode corresponding to D1, and parasitic factors $Cs_{1,2 \ldots n}$; $Csh_{1,2 \ldots n}$, that together contribute to the total effective parasitic capacitance Cr by the combined secondary effects of $Cs_1$, $Csh_1$ for output #1; $Cs_2$, $Csh_2$ for output #2; and $Cs_n$, $Csh_n$ for the nth output. The primary circuit parasitic capacitance factors Cd, Cp and Cm, and secondary circuit parasitic capacitance factors $Cs_{1,2 \ldots n}$; $Csh_{1,2 \ldots n}$ contribute to the total effective Cr in accordance with the square of the turns ratios of $(Np/Ns_1)^2$, $(Ns_2/Ns_1)^2$ - - - $(Ns_n/Ns_1)^2$. Thus the total parasitic reset capacitance can be obtained as follows:

$$Cr=(Cd+Cm+Cp)*(Np/Ns_1)^2+(Cs_1+Csh_1)+(Cs_2+Csh_2)*(Ns_2/Ns_1)^2+ \ldots +(Cs_n+Csh_n)*(Ns_n/Ns_1)^2 \quad (22)$$

Two design examples with reference to FIG. 4 demonstrate the secondary flyback reset circuit using parasitic capacitance. In the first example, it is a 28-V input, 5-V output, 50-W single-ended forward converter using just one output. Table I shows the parameters and resonant parasitic reset frequency (fr) for this first example. In the second example, it is a 28-V input, 15-V output, 65-W single-ended forward converter also using one output. Table II shows the parameters and resonant parasitic reset frequency (fr). In both examples it is observed that the Schottky diode contributes more than 50% of the total parasitic capacitance Cr and falls within a preferred range of to 500 to 5000 pf for operating at resonant reset frequencies in a preferred range of 450 kHz to 1000 kHz.

TABLE I Parameters of 28-V Input, 5-V Output, 50-W Converter

Np=3 turns
$Ns_1$=2 turns
Cd=20 pF
Cm=500 pF
Cp=30 pF
$Cs_1$=20 pF
$Csh_1$=2700 pF
Lms=9.5 uH
Cr=3958 pF
fr=821 kHz TABLE II Parameters of 28-V Input, 15-V Output, 65-W Converter Np=4 turns
$Ns_1$=7 turns
Cd=20 pF
Cm=500 pF
Cp=40 pF
$Cs_1$=70 pF
$Csh_1$=689 pF
Lms=116 uH
Cr=942 pF
fr=482 kHz While only particular embodiments have been disclosed herein, it will be readily apparent to persons skilled in the art that numerous changes and modifications can be made thereto, including the use of equivalent means, devices, and method steps without departing from the spirit of the invention.

What is claimed is:

1. In a single ended DC-to-DC forward converter of the type having a transformer and switched primary causing a magnetic flux excursion of a core of the transformer, and further comprising multiple single ended secondary outputs n (where n=1, 2, 3- - - nth), and wherein each said output has at least one diode as an output forward rectifier, said diodes having values of parasitic capacitance $Csh_1$, $Csh_2$, - - - $Csh_n$ that determine a total effective parasitic reset capacitance Cr that forms a transformer secondary flyback parasitic reset means including a resonant circuit of a secondary magnetizing inductance and said total effective parasitic reset capacitance Cr for resetting magnetic flux of the transformer core, where $Csh_1$=the parasitic capacitance of the output forward rectifier diode of secondary output n=1, $Csh_2$=the parasitic capacitance of the output forward rectifier diode of secondary output n=2, - - - and $Csh_n$=the parasitic capacitance of the output forward rectifier diode of secondary output n, and further having additional parasitic capacitance factors of Cd of a primary diode clamp circuit, Cm of a primary switch, Cp of the primary winding, $Cs_1$ of a first secondary winding and Csn of an nth secondary winding wherein the total effective parasitic capacitance Cr is determined by the formula:

$$Cr=(Cd+Cm+Cp)*(Np/Ns_1)^2+(Cs_1+Csh_1)+(Cs_2+Csh_2)*(Ns_2/Ns_1)^2+ \ldots +(Cs_n+Csh_n)*(Ns_n/Ns_1)^2$$

where Cd=the parasitic capacitance of the primary diode clamp circuit, Np=the number of secondary winding turns in secondary n=1, $Ns_2$=the number of secondary winding turns in secondary n=2, and $Ns_n$=the number of secondary winding turns in secondary n, Cm=the parasitic capacitance of the primary switch, and Cp=the parasitic capacitance of the primary winding.

* * * * *